Jan. 13, 1942.    T. W. HALLERBERG    2,269,664
SEAL CONSTRUCTION
Filed March 14, 1941
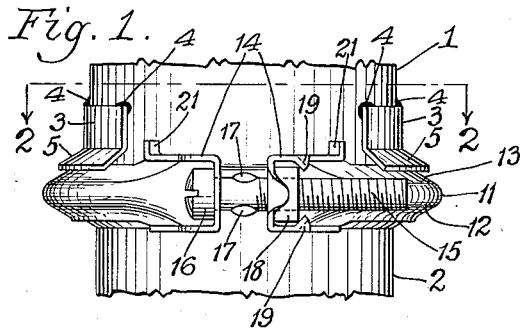
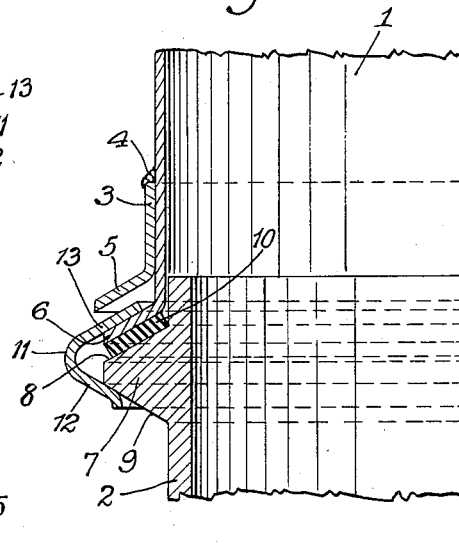
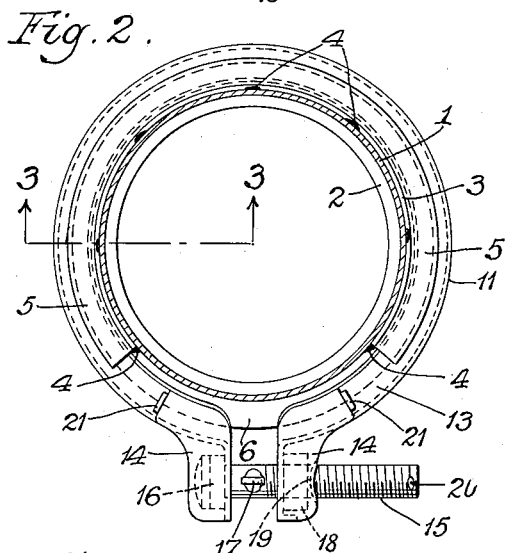
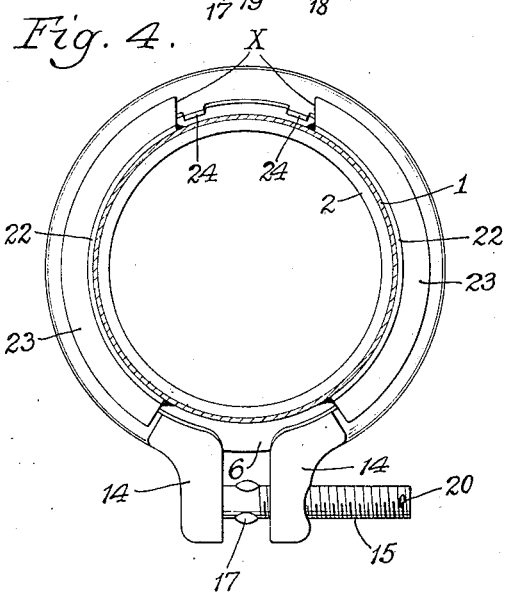
Inventor.
Theodore H. Hallerberg
by Parker & Carter
Attorneys.

Patented Jan. 13, 1942

2,269,664

UNITED STATES PATENT OFFICE 2,269,664

SEAL CONSTRUCTION

Theodore W. Hallerberg, Chicago, Ill., assignor to United Specialties Company, Chicago, Ill., a corporation of Delaware Application March 14, 1941, Serial No. 383,333

5 Claims. (Cl. 285—129)

This invention relates to a seal construction, a coupling or fastening by means of which a pair of generally tubular members may be joined together. In the form illustrated herewith it is particularly adapted for securing an air cleaner to a carburetor although it is not limited to that use. One object is to provide a coupling for the purpose mentioned so arranged that the two parts are held tightly together. Another object is to provide such a coupling so arranged that the parts, when being joined together, are drawn progressively closer to each other. Another object is to provide such a coupling in which looseness and rattling are prevented. A further object is to provide a coupling so arranged that during tightening it will not rotate, and it is, therefore, held in satisfactory position for fastening or tightening.

Other objects will appear throughout the specification and claims.

The invention is illustrated more or less diagrammatically in the accompanying drawing, wherein:

Figure 1 is a side elevation of the coupling in use joining a pair of tubular members;

Figure 2 is a transverse section taken at line 2—2 of Figure 1;

Figure 3 is a vertical sectional detail taken on an enlarged scale at line 3—3 of Figure 2;

Figure 4 is a section similar to Figure 2 and illustrating a modified form.

Like parts are designated by like characters throughout.

1 is the outlet passage or sleeve by means of which air is carried from an air cleaner to the carburetor air horn or inlet member 2. As shown, there is secured to the air cleaner sleeve 1, a retaining member 3 which fits about the outside of the sleeve 1 and is fastened thereto by any suitable means; for example, by welding 4. The member 3 has preferably formed integrally with it an outwardly inclined clamp-retaining flange 5, and the lower or bottom end of the sleeve or tube 1 is preferably outwardly inclined to form a flange 6 which may be of the same inclination as the flange 5. The flange 6 is shown as slightly shorter than the flange 5 but this is not an essential feature. The length of the flange 6 may be varied as desired.

Attached to or formed integrally with the carburetor air horn or inlet pipe is a projection 7. As shown, this projection is provided with an inclined upper surface portion 8 and an inclined lower surface portion 9. The angles of inclination of the two inclined surface portions 8 and 9 may be the same, and they are oppositely directed with respect to each other. The degree of inclination of the members 8 and 9 may be varied without departing from the spirit of the invention. A gasket or packing member 10 may be positioned upon the surface 8 of the member 7, if desired. Preferably, although not essentially, the inner edge of the surface member 8 terminates at a point below the outer or upper edge of the air horn 2.

11 is a clamp ring which is formed with a pair of divergent cam members 12 and 13. It is provided at each end with an outwardly bent perforated ear 14, 14 arranged to receive a screw 15. The head 16 of the screw lies against one of the perforated ears 14 and the screw is preferably pinched as at 17, 17 to prevent its complete removal from the ear through which it passes. The screw passes through the opposite ear 14 and a nut 18 is received in that ear which is shaped to prevent rotation of the nut and is provided with members 19, 19 which are peened over after the nut is in place. The portions 19, holding the nut in place, make sure that the screw will spread the clamp open when the screw is rotated in the opening or loosening direction. Adjacent its outer end the threads of the screw 15 are nicked or distorted as at 20 to prevent the screw from being completely turned out of the righthand ear 14.

At or near the ears 14 lugs 21 are provided. As shown, these are upturned and, when the clamp ring is rotated in either direction, one or another of the lugs 21 will contact the end of the clamp-retaining flange 5 and prevent further relative movement or rotation of the clamp with respect to the retaining flange.

As shown in Figure 4, the construction of the clamp ring and associated parts is generally the same but, instead of a continuous clamp-retaining member 3, 5, there are two clamp retainers comprising members 22, each of which carries a clamp-retaining flange 23. The upwardly extending lugs 21 are omitted from the ears 14, and in their place a pair of lugs 24 is provided. These lugs lie within the space X formed between the ends of the retaining flanges 23, 23, and thus the lugs will contact the end of one or the other retaining flanges 23 and prevent rotation in the manner described above in connection with Figure 2.

Although there is shown an operative form of the device, it will be understood that many changes in the form, shape and arrangement of parts might be made without departing from the spirit of this invention; and it is wished that this showing be taken as in a sense diagrammatic. In particular, although the flange 6 and the retainer 5 are inclined and although the face 8 of the flange 7 is similarly inclined, the degree of inclination is not an essential feature of the invention. In fact, they need not be inclined at all. It is preferable, however, that these parts be parallel with each other, as shown particularly in Figure 3.

The use and operation of this invention are as follows:

When the clamp or union of the present invention is used to secure an air cleaner to a carburetor, the clamp ring is initially sprung or snapped onto the flange portion 6 of the member 1, the screw 15 is put in place, and it may be shaped as at 17 and 20 to prevent its subsequent dislodgement from the clamping ring. The air cleaner, with the ring thus in place, is then put down over the inlet tube or air horn of the carburetor with the flange 6 resting upon the gasket 20. The clamp is then tightened. The lug 21 engages the edge of the clamp retainer and prevents the clamp from rotating under pressure of the screw driver or other tool which is used in rotating the screw to tighten the clamp.

As the clamp is tightened, the portion 12 cams against the lower face 9 of the member 7 and draws the clamp downward along the face 9, and this camming and clamping action causes the flange 6 to be drawn downwardly and to compress the gasket 10. A sufficient tightening of the screw 15 holds the air cleaner tightly upon the carburetor, prevents rattling, and, because of the tightness of the fit, leakage from the joint is impossible. The member 1 is not split and is continuous and uninterrupted, as is also the flange 6. The tightening is not due to any distortion or contraction of the flange 6 or the member 1 but is due to the force with which the flange 6 is drawn down upon the gasket 10.

I claim:

1. In combination, a fluid intake tube having on its outside a flange, and a fluid discharge tube shaped and adapted to be positioned about said intake tube, and a retainer positioned on said discharge tube above its lower end, and a clamp ring having separated ends and means for drawing said ends together, said clamp ring being positioned about the end of said discharge tube and beneath said retainer, said clamp ring adapted, when the two tubes are placed together, to engage the flange of said intake tube and to overlie the lower surface of said flange, said clamp shaped and adapted, as its ends are drawn together, to have a camming action on the lower surface of the flange of said intake tube to draw the two tubes progressively together as the clamp is tightened.

2. In combination, a fluid intake tube having on its outside a flange, and a fluid discharge tube shaped and adapted to be positioned about said intake tube, and a retainer positioned on said discharge tube above its lower end, and a clamp ring having separated ends and means for drawing said ends together, said clamp ring being positioned about the end of said discharge tube and beneath said retainer, said clamp ring adapted, when the two tubes are placed together, to engage the flange of said intake tube and to overlie the lower surface of said flange, means on said clamp adapted to contact said retainer to limit relative rotation of the clamp and retainer, said clamp shaped and adapted, as its ends are drawn together, to have a camming action on the lower surface of the flange of said intake tube to draw the two tubes progressively together as the clamp is tightened.

3. In combination, a fluid intake tube having on its outside a flange, and a fluid discharge tube shaped and adapted to be positioned about said intake tube and terminating in a downwardly and outwardly inclined flange having substantially the same inclination as the adjacent face of the flange of said intake tube, and a retainer positioned on said discharge tube above its lower end, said retainer extending only partially about said discharge tube, and a clamp ring having separated ends and means for drawing said ends together, said clamp ring being positioned about the end of said discharge tube and beneath said retainer, said clamp ring adapted, when the two tubes are placed together, to engage the flange of said intake tube and to overlie the lower surface of said flange, said clamp shaped and adapted, as its ends are drawn together, to have a camming action on the lower surface of the flange of said intake tube to draw the two tubes progressively together as the clamp is tightened.

4. In combination in a clamp, a tubular member, a flange on the outside of said member positioned away from its end, said flange having inclined upper and lower surfaces, a second tubular member dimensioned to fit over the end of said first tubular member, and an inclined flange at the end of said second tubular member, the inclination of said flange being substantially the same as that of the adjacent face of the flange of said first mentioned tubular member, a clamp-retaining member positioned upon said second tubular member and including a flange generally parallel with the flange of said first tubular member and positioned inwardly therefrom, and a clamp comprising a ringlike member of generally angular cross section and provided with two oppositely disposed internal camming surfaces, said clamp being positioned upon said second tubular member and under its clamp retainer and adapted to engage the lower face of the flange of said first tubular member, means for tightening said clamp, projections from said clamp adapted to contact said clamp retainer and to prevent relative rotation of the clamp and retainer.

5. In combination, a tube having an outwardly projecting flange, said flange being shaped to provide a lower inclined face, and a second tube having an outwardly extending flange adapted to contact the flange of said first tube, and a clamp retainer secured to said second tube and comprising a flange spaced away from the first mentioned flange of said second tube, and a unitary clamp ring provided with parts adapted to be drawn together to tighten said ring, said clamp ring being positioned beneath said clamp retainer, means on said ring to contact said retainer to prevent relative rotation of the two, said clamp ring adapted to engage the flange of said first tube and shaped to be drawn progressively downward along said flange when the ring is tightened, and means for tightening the ring.

THEODORE W. HALLERBERG.